June 5, 1962   R. THUM ET AL   3,037,325
METHOD FOR REDUCING UNDULATIONS IN A GLASS STRIP
CONTINUOUSLY DRAWN FROM A GLASS MELT
Filed Aug. 15, 1958   2 Sheets-Sheet 1

3,037,325
METHOD FOR REDUCING UNDULATIONS IN A GLASS STRIP CONTINUOUSLY DRAWN FROM A GLASS MELT

Rudolf Thum, Witten (Ruhr), Georg Kilian, Furth, Bavaria, Germany, and Rembert Ramsauer, deceased, late of Witten (Ruhr), Germany, by Marianne Ramsauer, heir, Kolbengarten 22, Heidelberg, Germany, assignors to Deutsche Tafelglas Aktiengesellschaft Detag, Furth, Bavaria, Germany, a company of Germany
Filed Aug. 15, 1958, Ser. No. 755,848
Claims priority, application Germany Mar. 27, 1953
3 Claims. (Cl. 49—83.1)

This invention relates to a method of reducing the waviness of a glass sheet drawn upwardly continuously from a bath of molten glass through a drawing chamber as, for example, in the Fourcault method of drawing glass.

This application is a continuation-in-part of our application Serial No. 416,362 filed March 15, 1954, now Patent No. 2,849,837 issued September 2, 1958.

In the manufacture of sheet glass according to the drawing process, substantial defects are known to occur inasmuch as the surface of the sheet drawn from the molten glass has a slightly wavy quality which adversely affects the optical properties of the sheet, namely, that when the sheet is looked through from an angle or when the sheet reflects from an angle, it produces optical distortions. Many attempts have been made to avoid these drawing waves by introducing into the drawing chamber a preheated gas, e.g., air, in such a manner that it flows along both sides of the glass sheet transversely to the direction of drawing. These endeavors, however, have not been entirely successful in reducing waves to the extent desired because prior workers in the art have not realized the great importance played by the temperatures of the gas introduced into the drawing chamber nor its place of introduction into the drawing chamber. We have been able to greatly reduce the waviness in drawn sheet glass by taking these two factors into consideration.

In the accompanying drawings which illustrate a glass drawing machine suitable for carrying out our method, FIGURE 1 is a vertical section taken on the line I—I of FIGURE 2, showing a portion of a glass melting tank and means for drawing a sheet of glass upwardly;

Figure 1:
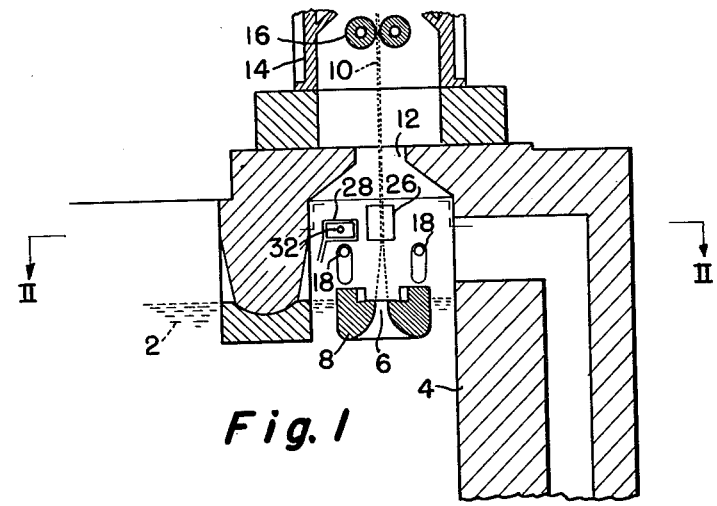
Figures 5, 6:
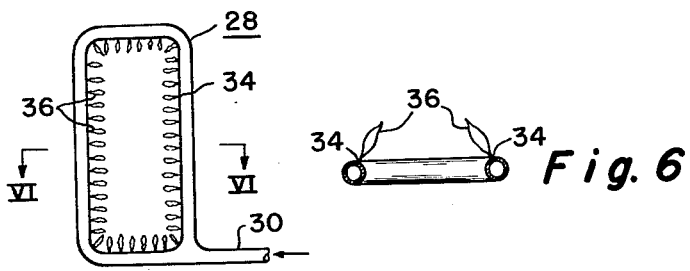
FIGURE 5 is a plan view on an enlarged scale of one of the ring burners used for heating the air introduced into the drawing chamber.
FIGURE 6 is a section taken on the line VI—VI of FIGURE 5.

In carrying out our method, a glass sheet is drawn upwardly continuously from a bath of molten glass through a drawing chamber and the glass is cooled near its point of emergence from the bath. A gas, e.g., air, is introduced into the drawing chamber and is caused to flow transversely to the direction of movement of the glass sheet and across the whole width of the sheet and on each side thereof and in contact therewith. The gas introduced into the drawing chamber, before coming in contact with the glass sheet, is heated to about the average gas temperature in the drawing chamber so that the transversely flowing gas does not substantially change the average gas temperature in the drawing chamber. The gas is introduced into the drawing chamber and flows transversely of the glass sheet at that zone in the drawing chamber which lies just ahead of the place at which final solidification of the glass sheet occurs. Thus, our method is concerned not only with the temperature at which the gas is introduced into the drawing chamber but also with the location of the level in the glass drawing chamber at which the gas is introduced.

In drawing sheet glass upwardly from a bath of molten glass through a slot in a debiteuse, coolers are located in the drawing chamber near the place where the glass issues from the slot, i.e., the coolers are located near the drawing bulb. The coolers convert the glass mass issuing from the slot in the debiteuse and change the still liquid glass into the plastic state and thus prevent the glass mass issuing from the slot under hydrostatic pressure from flooding the debiteuse.

In order to visualize the importance of the temperature at which the transversely flowing gas is introduced into the drawing chamber and the level in the drawing chamber at which it is introduced, reference is made to the temperatures involved in a typical example as follows. The viscous glass mass leaves the slot of the debiteuse under hydrostatic pressure at a temperature of about 900° C. Under the action of the coolers located near the drawing bulb, the liquid glass is converted into the plastic state and the glass sheet begins to take shape. The temperature of the glass sheet decreases rapidly during its passage through the zone in which the coolers are located. The glass sheet leaves the drawing chamber at a temperature somewhat below about 600° C. In the zone between the coolers and the exit passage of the drawing chamber, the glass sheet is still plastic enough that it can be influenced by thermally non-homogeneous vertical air currents which are always present in the drawing chamber unless some means is taken to prevent their existence. These non-homogeneous vertical air currents act on the glass sheet to produce waves. This final zone of the drawing chamber, i.e., the zone between the coolers and the exit passage of the drawing chamber, is not only the last place in the drawing chamber at which vertical air currents can cause wave information in the glass sheet but it is also the last place and the most effective place where formation of waves can be greatly reduced on entirely prevented by circulating heated air or other gas around the sheet in a direction transverse to the direction of drawing of the sheet. The particular glass used in this illustrative example of temperatures has a softening point of about 550° C. Below that temperature it cannot be influenced by gas currents. In this example, the average gas temperature in the drawing chamber was about 435° C. In order to prevent or decrease the formation of waves in the glass sheet, the air introduced into the glass drawing chamber, before coming in contact with the glass sheet, was heated to a temperature of about 450° C. and at the zone or level of the glass drawing chamber at which the transversely flowing air was introduced, the glass sheet had a temperature of about 600° C. Thus, the transversely circulating gas, before coming in contact with the glass sheet, was heated to about the average gas temperature in the drawing chamber and it was introduced into the drawing chamber and flowed transversely of the glass sheet at that zone in the drawing chamber which lies just ahead of the place at which final solidification of the glass sheet occurs.

It follows furthermore that all temperatures of the transversely flowing gas introduced into the drawing chamber which are substantially above the average gas temperature in the drawing chamber displace the plastic range of glass sheet upwardly and increase the vertical air currents, thereby tending to increase wave formation in the glass sheet. It is only when the transversely flowing gas introduced into the drawing chamber is at about the average gas temperature in the drawing chamber that there is thermal equilibrium with the gases in the drawing chamber. Such gas flow neither increases nor decreases the rate of cooling of the glass sheet. It does not cause any additional bouyancy in the drawing chamber nor does it require, in order to flow from one edge to the other of the glass sheet, any mechanical means such as guides. Smoke tests which make the gas currents in the drawing chamber visible have shown that in the present process the introduced gas flows practically in a horizontal direction through the drawing chamber and so equalizes in an ideal manner the vertical gas or air currents both in a thermal and a kinetic manner, whereby stresses in the glass sheet are equalized.

The average gas temperature in the drawing chamber depends on the glass composition, the thickness of the glass sheet, the drawing velocity and the intensity of the cooling produced by the coolers. It is between about 350 and 500° C. and is generally between 380 and 480° C.

The temperature of the gas which is introduced into the drawing chamber and flows transversely of the glass sheet depends upon the average gas temperature in the drawing chamber and is within about 50 degrees of that temperature. Thus, the temperature of the gas which is introduced into the drawing chamber is from 300 to 550° C. and is generally between about 330 and 530° C.

The temperature of the glass sheet at the zone at which the cross gas flow is introduced is between about 550 and 700° C.

Referring now more particularly to the accompanying drawings and for the present to FIGURES 1, 2, 5 and 6, a glass melt 2 is located in the drawing chamber 4 of a glass melting tank. The glass is drawn upwardly continuously through a slot 6 in a debiteuse 8 in the form of a glass sheet 10. The glass sheet, which solidifies in the drawing chamber at a point adjacent the exit passage 12 of the drawing chamber, is gripped inside the lehr 14 by pairs of rollers 16, the pairs being arranged one above the other, and conveyed upwardly through the lehr. Above the debiteuse 8, water coolers 18 are arranged in a known manner and at a certain distance from the glass sheet, these water coolers extending at least along the length of the slot 6 in the debiteuse 8. The water coolers 18 are connected with supply pipes 20 and delivery pipes 22. Each end of the drawing chamber is closed by a metal shield 24 which is provided with an inspection window 26. Each inspection window is located in the drawing chamber at a level above the water coolers 18 and in line with the longitudinal axis of the slot 6 in the debiteuse.

Figure 2:
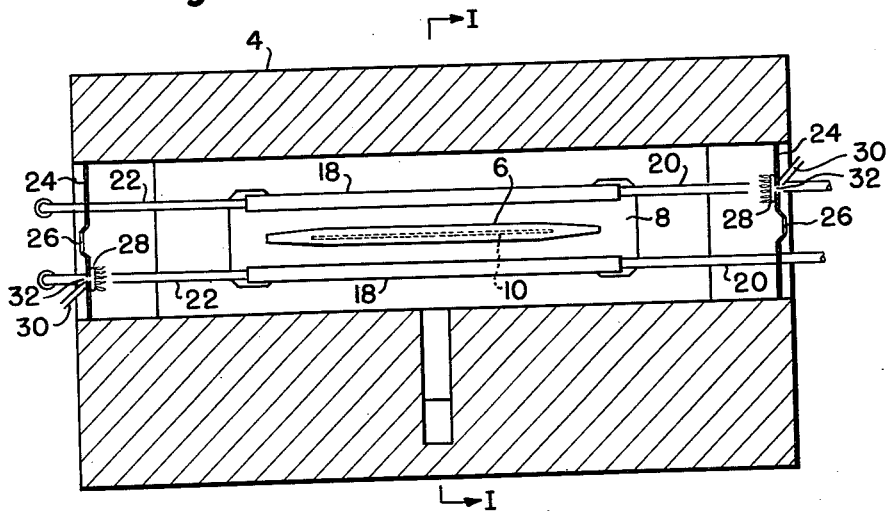
FIGURE 2 is a horizontal section taken on the line II—II of FIGURE 1.

Two burner rings 28 are located in the drawing chamber as shown in FIGURE 2, each burner ring being mounted on one of the metal shields 24. Combustible gas is supplied to these burner rings by supply pipes 30. Atmospheric air enters the drawing chamber from outside through suitable perforations 32 in the metal shields 24. Air is drawn into the glass drawing chamber due to the fact that a negative pressure exists in the chamber.

Preferably, the gas openings 34 in the burners 28 are so designed and arranged that the flames 36 are inclined at an angle of about 30° to the direction of flow of the air current entering through the openings 32. By means of this arrangement of the burner rings, an injection-like effect is exercised on the inflowing current of air which further assists the suction action of the drawing chamber. The shape and number of the openings 32 in the metal shields 24 which are surrounded by the burner rings 28 may be varied to suit particular conditions. Other sources of heat as, for instance, electrical heating devices, may be employed in place of the gas burner rings 28. If required, in order to heat the air to the required temperature, two or more gas burner rings or other heating means may be arranged in parallel or in series.

The burners 28 are located in the glass drawing chamber at a level above the coolers 18 and below the exit passage 12. Their location is such that the air entering the chamber through the perforations 32 is introduced into the drawing chamber and flows transversely of the glass sheet at that zone in the drawing chamber which lies just ahead of the place at which final solidification of the glass sheet occurs. The place at which final solidification of the glass sheet occurs is approximately at the exit passage 12 of the glass drawing chamber or slightly below it. The highly heated products of combustion resulting from the combustion of the mixture of air entering the chamber through perforations 32 and the combustible gas issuing from the openings 34 of the burners 28 flow transversely to the direction of movement of the glass sheet and across the whole width of the sheet and on each side thereof and in contact therewith.

Figure 3:
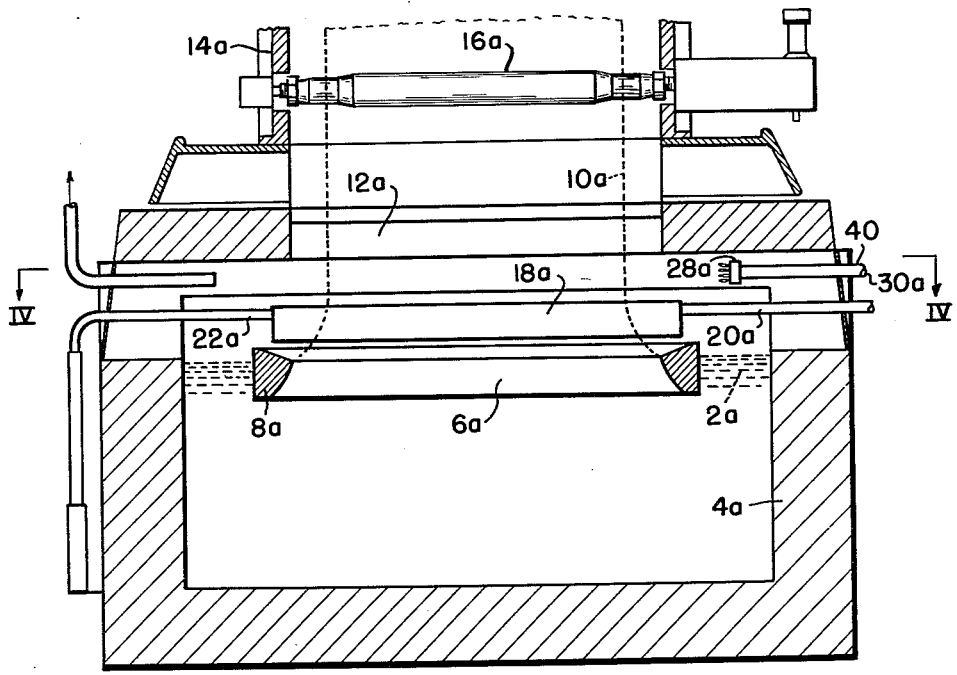
FIGURE 3 is a vertical section taken on the line III—III of FIGURE 4, illustrating another embodiment of the invention.
Figure 4:
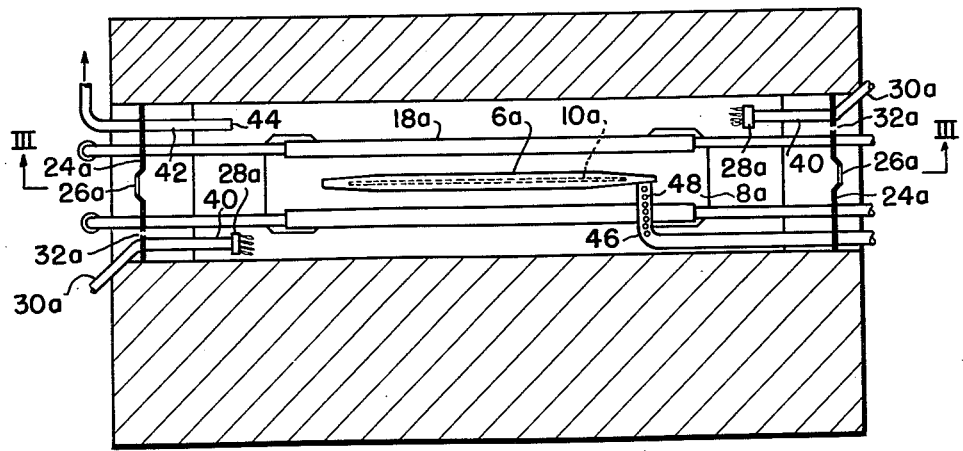
FIGURE 4 is a horizontal section taken on the line IV—IV of FIGURE 3.

Referring now to the embodiment shown in FIGURES 3 and 4, this embodiment is generally similar to that shown in FIGURE 1 but differs in respect to certain details. In the embodiment shown in FIGURES 3 and 4, corresponding parts have been designated by the same reference numerals with an *a* suffixed. The burner rings 28*a*, instead of being mounted on the metal shields 24*a* which close the ends of the glass drawing chamber, extend into the chamber. These burner rings 28*a* are supplied with combustible gas through pipes 30*a* and 40. Air is supplied to the glass drawing chamber through perforations 32*a* in the metal shields 24*a*.

As shown in the upper part of FIGURE 4, a suction pipe 42, having an opening 44 extending inside the glass drawing chamber, is provided for drawing off the gases which have passed along one side of the glass sheet, the pipe 42 being provided with a suction device (not shown). The arrangement of such a suction pipe is advisable, more particularly in the case of large widths of glass sheets, in order to insure that the highly heated air will be led transversely to the drawing direction of the glass sheet over the entire width of the sheet.

Instead of the suction pipe 42, there may be arranged, as shown in the lower part of FIGURE 4, in the proximity of the edge of the glass sheet which is removed from the burners 28*a*, a pipe 46 extending from this edge preferably to the wall of the drawing chamber. This pipe is provided with perforations 48 from which heated gases flow vertically upwards. This vertically upward flow of heated gases strengthens the suction on the highly heated gases flowing transversely to the drawing direction of the glass sheet and has the effect that the same is caused to flow along the whole width of the glass sheet. The vertically ascending gas current issuing from the openings 48 may be combustion gases or merely heated gases not resulting from combustion.

Suction devices similar to the suction pipe 42 or the pipe 46 shown in FIGURE 4 can be used in the embodiment shown in FIGURES 1 and 2. The use of such pipes is advisable, more particularly in the case of large widths of glass sheets, in order to insure that the highly heated gases flowing transversely to the direction of drawing of the glass sheet will be led along both widths of the glass sheet with certainty.

The invention is not limited to the preferred embodiment but may be otherwise embodied or practiced within the scope of the following claims.

We claim:

1. A method of reducing the waviness of a glass sheet drawn upwardly continuously from a bath of molten glass through a drawing chamber by cooling the glass near its point of emergence from the bath and introducing gas into the drawing chamber and causing said gas to flow transversely to the direction of movement of the glass sheet and across the whole width of the sheet and on each side thereof and in contact therewith, characterized in that said gas introduced into the drawing chamber, before coming in contact with the glass sheet, is heated to about the average gas temperature in the drawing chamber so that the transversely flowing gas does not substantially change the average gas temperature in the drawing chamber, and further characterized in that the gas is introduced into the drawing chamber and flows transversely of the glass sheet at that zone in the drawing chamber which lies just ahead of the place at which final solidification of the glass sheet occurs.

2. A method according to claim 1, wherein the average gas temperature in the drawing chamber is about 350–500° C. and said gas introduced into the drawing chamber, before coming in contact with the glass sheet is heated to within about 50° C. of said average gas temperature.

3. A method according to claim 1, wherein the average gas temperature in the drawing chamber is about 380–480° C. and said gas introduced into the drawing chamber, before coming in contact with the glass sheet, is heated to within about 50° C. of said average gas temperature.

References Cited in the file of this patent

UNITED STATES PATENTS

| | | |
|---|---|---|
| 2,116,693 | Bishop | May 10, 1938 |
| 2,246,053 | Magrini | June 17, 1941 |
| 2,519,457 | Halbach et al. | Aug. 22, 1950 |

UNITED STATES PATENT OFFICE
CERTIFICATE OF CORRECTION

Patent No. 3,037,325 June 5, 1962

Rudolf Thum et al.

It is hereby certified that error appears in the above numbered patent requiring correction and that the said Letters Patent should read as corrected below.

Column 2, line 41, for "information" read -- formation --
line 43, for "on" read -- or --.

Signed and sealed this 9th day of October 1962.

(SEAL)
Attest:

ERNEST W. SWIDER
Attesting Officer

DAVID L. LADD
Commissioner of Patents